United States Patent
Chang (12)

(10) Patent No.: US 8,824,130 B2
(45) Date of Patent: Sep. 2, 2014

(54) CHIP CARD HOLDER AND ELECTRONIC DEVICE WITH SAME

(75) Inventor: Chia-Hsin Chang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 216 days.

(21) Appl. No.: 13/524,328

(22) Filed: Jun. 15, 2012

(65) Prior Publication Data

US 2013/0235532 A1    Sep. 12, 2013

(30) Foreign Application Priority Data

Mar. 8, 2012    (CN) .......................... 2012 1 0059701

(51) Int. Cl.
*G06F 1/16*    (2006.01)

(52) U.S. Cl.
USPC ....... 361/679.31; 312/219; 439/629; 235/441

(58) Field of Classification Search
CPC ........................................................ G06F 1/00
USPC .......... 455/41.1, 558, 411, 550.1, 556.2, 419,
455/405; 235/492, 375, 439, 487, 449, 380,
235/441; 439/492, 375, 439, 487, 449, 380,
439/441; 312/215, 219, 221; 248/298.1,
248/649; 361/752, 754, 756, 798, 679.01,
361/810, 679.44, 679.41, 679.31, 679.6,
361/679.22, 679.4, 679.32, 679.33, 679.27,
361/679.55

See application file for complete search history.

(56) References Cited

U.S. PATENT DOCUMENTS

2013/0235534 A1*    9/2013    Chang ........................... 361/727
2013/0235548 A1*    9/2013    Chang ........................... 361/810

FOREIGN PATENT DOCUMENTS

TW                565056 U      12/2003
TW                M406282 U     6/2011

* cited by examiner

*Primary Examiner* — Hung Duong
(74) *Attorney, Agent, or Firm* — Novak Druce Connolly Bove + Quigg LLP

(57) ABSTRACT

A chip card holder includes a base, a first retaining board attached to the base, a second retaining board attached to the base spaced apart from the first retaining board, and a receptacle is defined between the first retaining board and the second retaining board. The first retaining board has a first electrical connector. The second retaining board has a second electrical connector. A drawer is movably received in the receptacle. When the drawer received in the receptacle, the chip cards are retained between the first electrical connector and the second electrical connector.

10 Claims, 7 Drawing Sheets

CHIP CARD HOLDER AND ELECTRONIC DEVICE WITH SAME

CROSS-REFERENCE TO RELATED APPLICATIONS

This application is related to co-pending U.S. patent application Ser. Nos. 13/524,331 and 13/524,337, entitled "CHIP CARD HOLDER AND ELECTRONIC DEVICE WITH SAME"; and co-pending U.S. patent application Ser. No. 13/453,156, entitled "PORTABLE ELECTRONIC DEVICE WITH CHIP CARD HOLDER", all by CHIA-HSIN CHANG. These applications have the same assignee as the present application. The above-identified applications are incorporated herein by reference.

BACKGROUND

1. Technical Field

The present disclosure relates to electronic devices, and particularly to portable electronic devices with chip card holders.

2. Description of Related Art

A dual-SIM capable mobile terminal uses one or two SIM cards. A dual-SIM mobile terminal with two SIM cards can switch between SIM cards according to a user selection. A dual-SIM mobile terminal with two SIM cards can also be used with two different phone numbers.

Typical chip card holders define two side-by-side receiving spaces for receiving the SIM cards, Side-by-side grooves, however, occupy a large area of the mobile terminal.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card holder and electronic device using the chip card holders. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
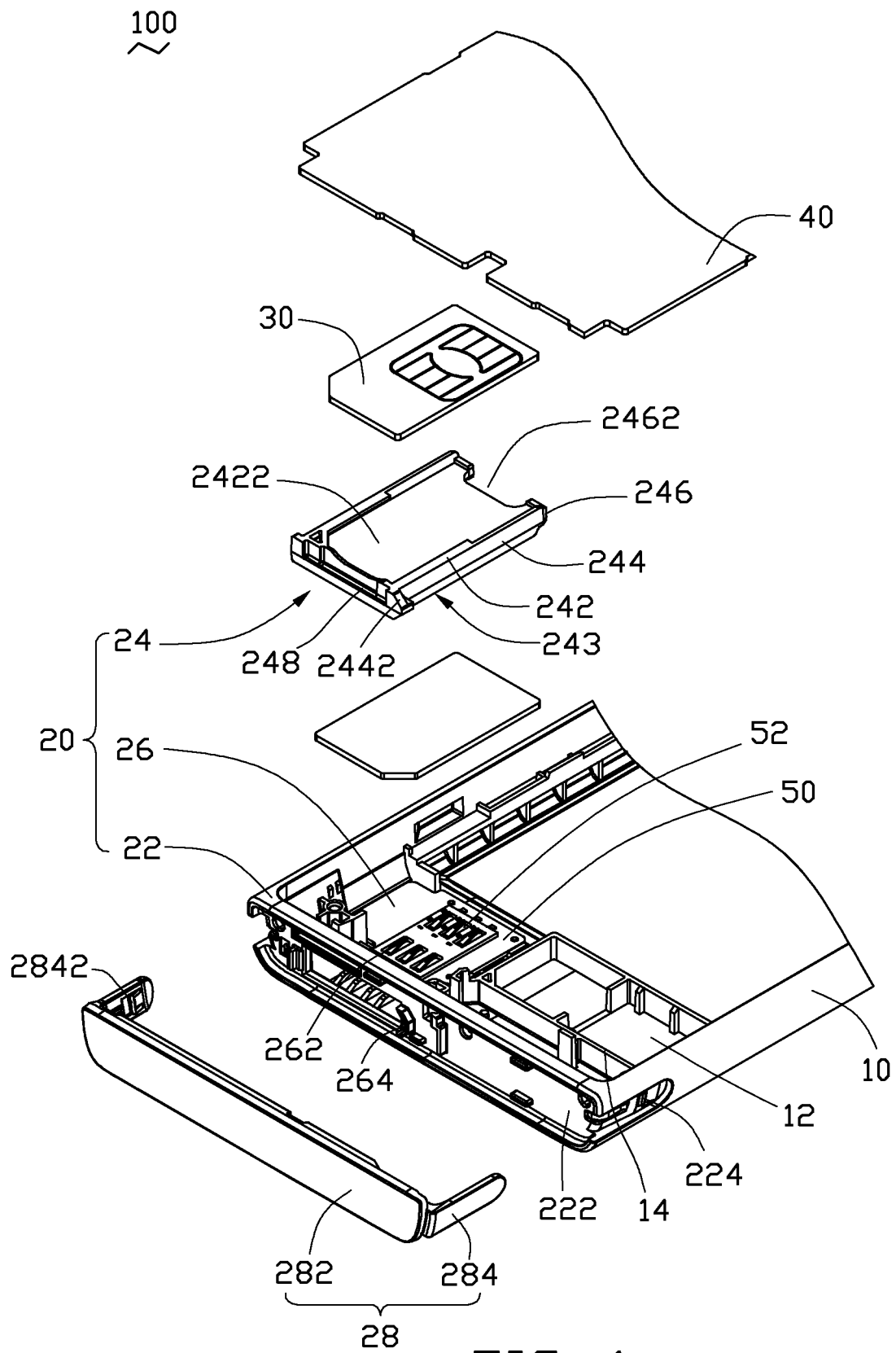
FIG. 1 is an exploded view of an exemplary embodiment of a chip card holder as used in a portable electronic device, the portion of the portable electronic device including a housing, two chip cards and a chip card holder.
Figure 2:
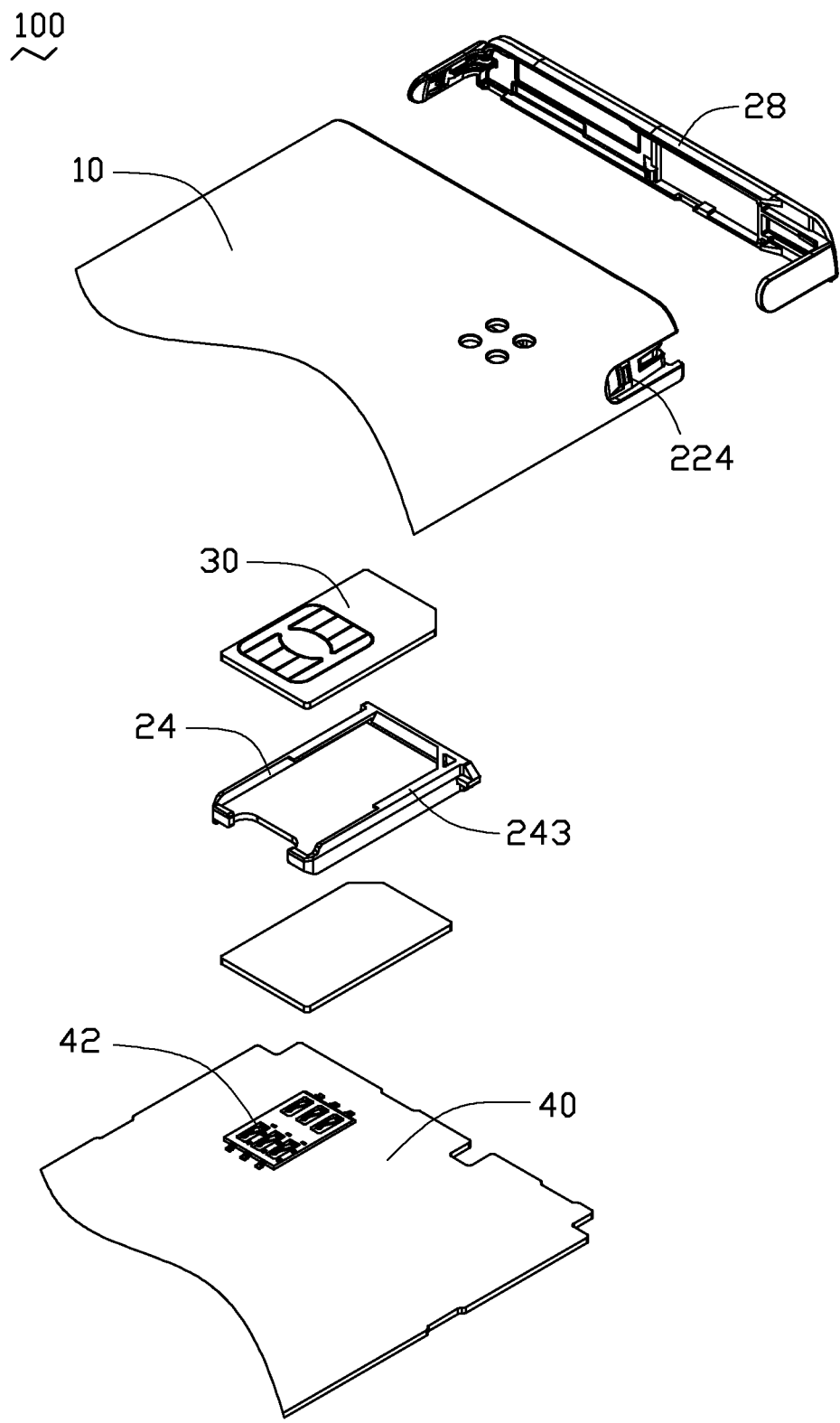
FIG. 2 is similar to FIG. 1, but viewing from another aspect.
Figure 3:
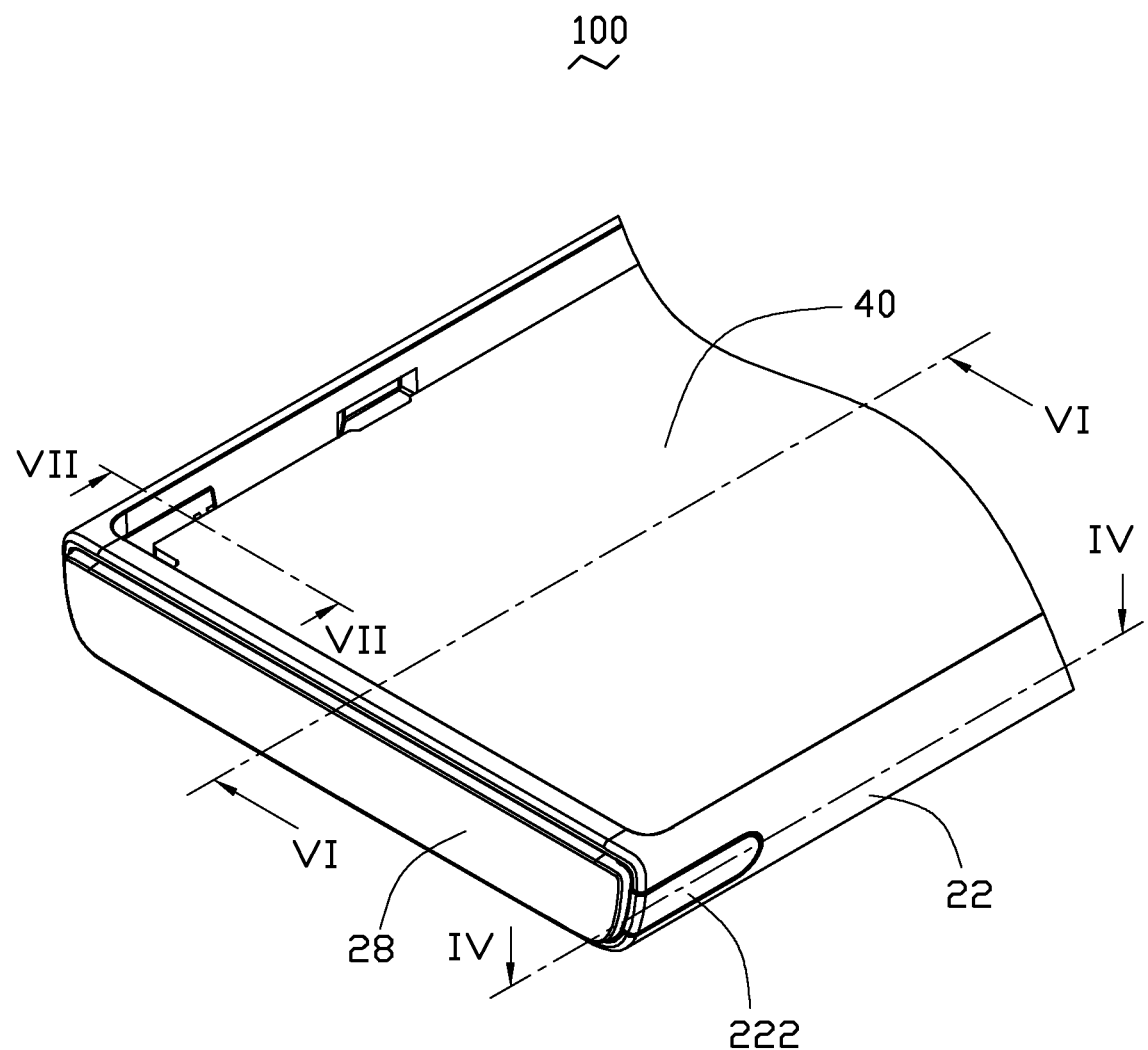
FIG. 3 is an assembled view of the portable electronic device.
Figure 4:
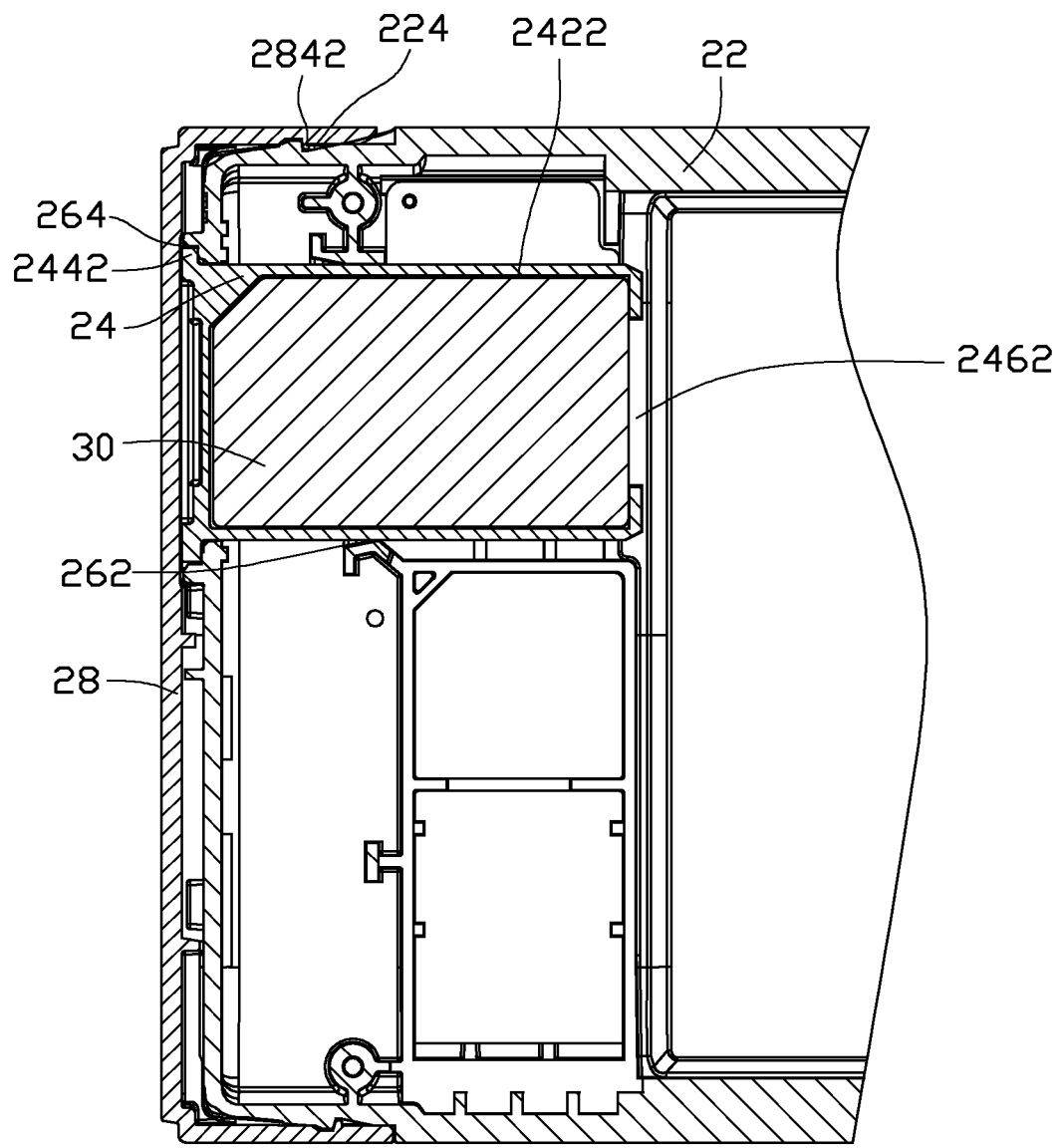
FIG. 4 is a cross sectional view of the portable electronic device of FIG. 3 along the line of IV-IV.
Figure 5:
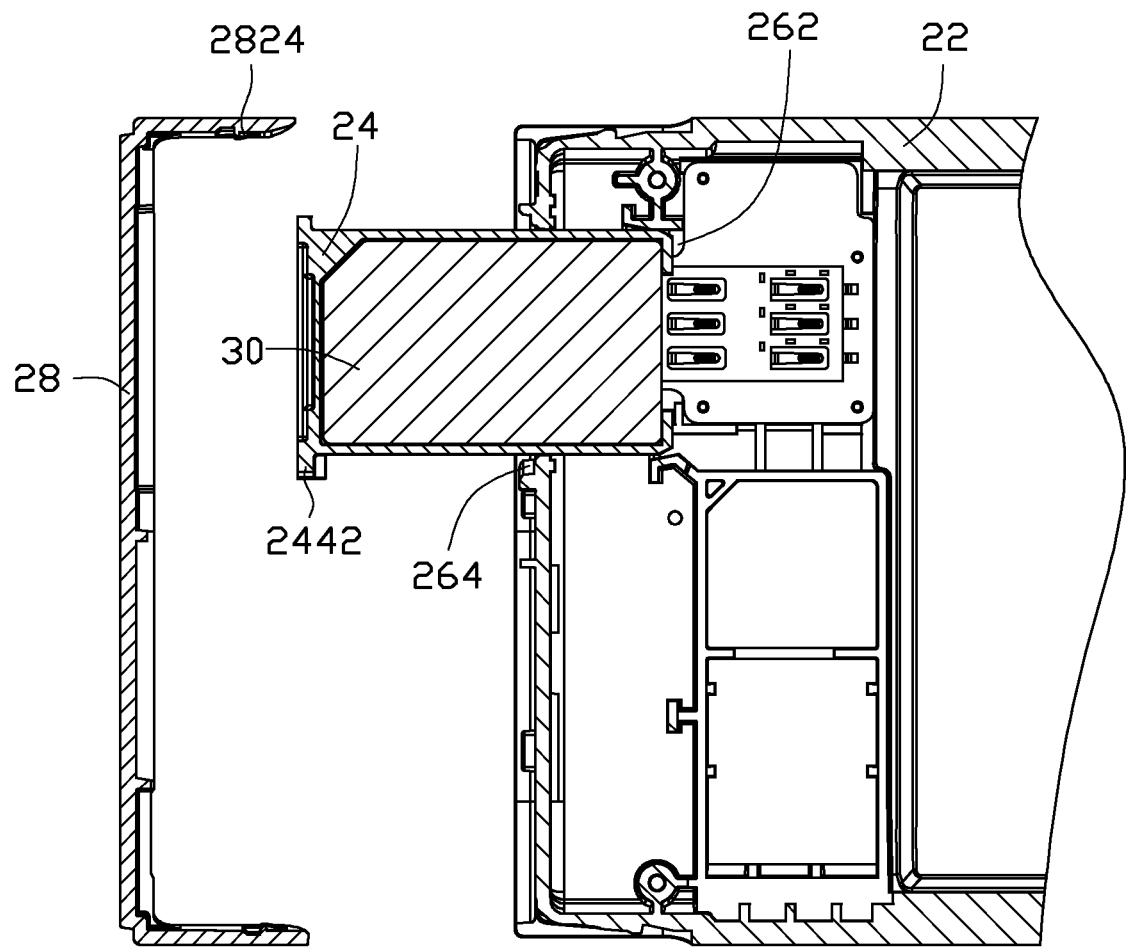
FIG. 5 is similar to FIG. 4, but the chip card(s) is/are ejected out of the housing.
Figure 6:
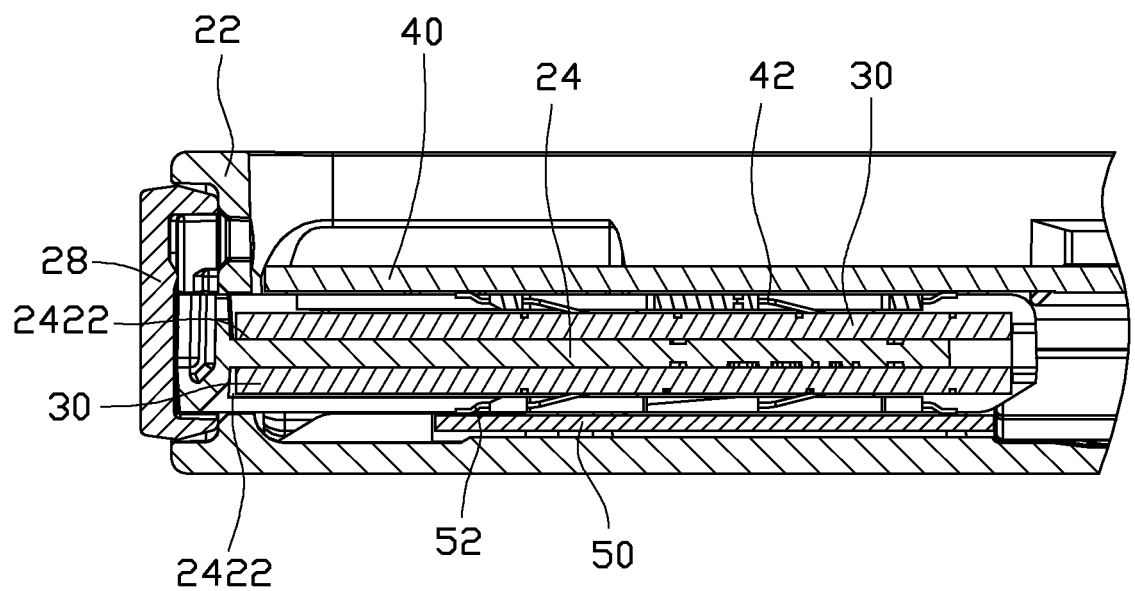
FIG. 6 is a cross sectional view of the portable electronic device of FIG. 3 along the line of VI-VI.

FIGS. 1 to 3 show an exemplary embodiment an electronic device 100, such as a cellular phone or any electronic device using a chip card. The electronic device 100 includes a housing 10, a chip card holder 20, a first retaining board 40, a second retaining board 50, a first electrical connector 42 and a second electrical connector 52.

The housing includes a main body 12 and a retaining board 14 located on the main body 12.

The chip card holder 20 is attached to the housing 10. Two chip cards 30 can be simultaneously attached to the chip card holder 20. The chip card holder 20 includes a base 22, a drawer 24 and a cabinet 26. The cabinet 26 is defined in the base 22, in which the drawer 24 is received.

The base 22 may be a portion of the housing 10 or a separate element fixed to the housing 10. In this exemplary embodiment, the base 22 is a portion of the housing 10.

The drawer 24 includes a first surface 242, a second surface 243 spaced apart from the first surface 242, two opposite sidewalls 244, a first end 246 and a second end 248 spaced apart from the first end 246. The first surface 242 and the second surface 243 each define a receiving space 2422, in which one of the chip or flash cards 30 is received. Two limiting blocks 2442 protrudes from the sidewalls 244. In this exemplary embodiment, the limiting blocks 2442 are located near the second end 248. A cutout 2462 is defined at the first end 246 and communicates with the receiving spaces 2422 and can be used to facilitate removal of the chips cards 30 from the drawer 24 in the situation where the drawer 24 is completely removed from the cabinet 26.

The cabinet 26 includes a receiving compartment 262 and two limiting grooves 264. The drawer 24 is slidably received in the receiving compartment 262. The limiting grooves 264 are located at two sides of the receiving compartment 262 and communicate with the receiving compartment 262. Each limiting block 2442 is slidably received in one of the limiting grooves 264, to limit an inward maximum movement of the drawer 24, when sliding relative to the base 22. While in the current exemplary embodiment, the drawer 24 can be completely removed from the cabinet 26, in other embodiments, there may be additional structure that prevents complete removal of the drawer 24 and limits it outward maximum movement.

The chip cards 30 may both be subscriber identity modules (SIM) card or memory cards; or one of the chip cards 30 is SIM card, the other chip card 30 is memory cards.

Figure 7:
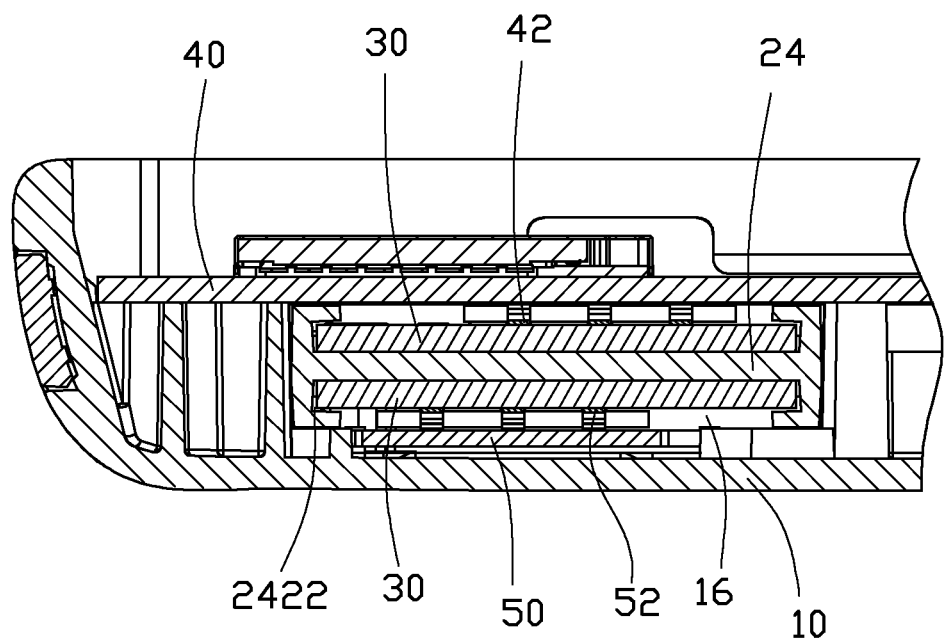
FIG. 7 is a cross sectional view of the electronic device of FIG. 3 along the line of VII-VII.

Referring to FIG. 7, the first retaining board 40 is for retaining the first electrical connector 42. The second retaining board 50 is for retaining the second electrical connector 52. The first retaining board 40 and the second retaining board 50 are spaced from each other, so a receptacle 16 is formed between the first retaining board 40 and the second retaining board 50. In other words, the first retaining board 40 and the second retaining board act as upper and lower sidewalls of the receptacle 16. The receptacle 16 is for receiving drawer 26 and the chip cards 30. In this exemplary embodiment, the first retaining board 40 is a first circuit board attached to the retaining board 14, the second retaining board 50 is a second circuit board attached to the main body 12. It is to be understood that, one of the first retaining board 40 and the second retaining board 50 may be a circuit board of the electrical device 100, with the other retaining board just being a plain plastic board.

The first electrical connector 42 is attached to a surface of the first retaining board 40 facing the second retaining board 50. The second electrical connector 52 is attached to a surface of the second retaining board 50 facing the first retaining board 40. The first electrical connector 42 is electrically connected to one of the chip cards 30, the second electrical connector 52 is electrically connected to the other chip card 30. In this exemplary embodiment, the first electrical connector 42 faces the second electrical connector 52.

Furthermore, the chip card holder 20 further includes a cover 28 covering the drawer 24 and detachably fixed to the base 22 so the drawer 24 is steadily fixed in the cabinet 26. In this exemplary embodiment, the cover 28 is substantially U-shaped, and includes a main body 282 and two latching portions 284 protruding from opposite ends of the main body 282. Each latching portion 284 includes a latching block 2842. The base 22 defines a slot 222 for accommodating the cover 28. The base 22 further defines two latching grooves 224. Each latching block 2842 is latched in one of the latching groove 224 so the cover 28 is latched in the slot 222 and the main body 282 presses the drawer 24 in the cabinet 26.

Referring to FIGS. 4 to 7, in use, the latching blocks 2842 are released from the latching grooves 224. The cover 28 is detached from the housing 10. The drawer 24 is slid out of the cabinet 26, either partially or entirely, as mentioned above. The chip cards 30 are put into the receiving spaces 2422. The drawer 24 is slid into the receiving compartment 262 of the cabinet 26 until the limiting blocks 2442 are limited in the limiting grooves 264. At this time, the chip cards 30 are retained in the receptacle 16, and respectively retained and electrically connected with the first connector 42 and the second connector 52, thereby putting the chip cards 30 in the electronic device 100.

In above chip card holder 20, the drawer 24 can be completely or partially slid out of the cabinet 26 to expose it from the base 22, thereby facilitating grasping chip cards 30 out of the receiving spaces 2422 or putting the chip cards 30 in the receiving spaces 2422. Additionally, the receiving spaces 2422 are arranged in a stack, and the first electrical connector 42 and the second electrical connector 52 are respectively located on the first retaining board 40 and the second retaining board 50, i.e., the opposite sidewalls of the receptacle 16, thereby reducing the area occupied by the chip card holder 20.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A chip card holder, the chip card holder comprising:
a base;
a first retaining board attached to the base, the first retaining board having a first electrical connector;
a second retaining board attached to the base and spaced apart from the first retaining board, the second retaining board having a second electrical connector facing the first electrical connector; and
a receptacle is defined between the first retaining board and the second retaining board; and
a drawer for supporting the chip cards and movably received in the receptacle;
wherein when the drawer received in the receptacle, the chip cards are retained between the first electrical connector and the second electrical connector.

2. The chip card holder of claim 1, wherein when the drawer received in the receptacle, one of the chip cards is electrically connected to the first electrical connector, the other chip card is electrically connected to the second electrical connector.

3. The chip card holder of claim 1, wherein the drawer defines two receiving spaces, each receiving space for receiving one of the chip cards.

4. The chip card holder of claim 3, further comprising a cabinet defined in the base, the drawer slidably received in the cabinet.

5. The chip card holder of claim 4, wherein the drawer includes a first surface and a second surface spaced apart from the first surface, the first surface and the second surface each define one of the receiving spaces.

6. An electronic device, comprising:
a housing;
a first retaining board attached to the base, the first retaining board having a first electrical connector;
a second retaining board attached to the base and spaced apart from the first retaining board, the second retaining board having a second electrical connector facing the first electrical connector; and
a receiving space is defined between the first retaining board and the second retaining board; and
a drawer for supporting the chip cards and movably received in the receptacle;
wherein when the drawer received in the receptacle, the chip cards are retained between the first electrical connector and the second electrical connector.

7. The electronic device of claim 6, wherein the drawer defining two receiving spaces, each receiving space for receiving one of the chip cards.

8. The electronic device of claim 7, further comprising a cabinet defined in the base, the drawer slidably received in the cabinet.

9. The electronic device of claim 8, wherein the drawer includes a first surface and a second surface spaced apart from the first surface, the first surface and the second surface each define one of the receiving spaces.

10. The electronic device of claim 9, wherein the drawer further includes two opposite sidewalls, a limiting block protrudes from each sidewall; the cabinet includes a receiving compartment and two limiting grooves; the drawer is slidably received in the receiving compartment; the limiting grooves are located at two sides of the receiving compartment and communicate with the receiving compartment, each limiting block is slidably accommodated in one of the limiting grooves to limit a maximum movement of the drawer sliding relative to the base.

* * * * *